US009695732B2

(12) United States Patent
Fujie et al.

(10) Patent No.: US 9,695,732 B2
(45) Date of Patent: Jul. 4, 2017

(54) DIAGNOSTIC DEVICE (71) Applicant: ISUZU MOTORS LIMITED, Tokyo (JP)

(72) Inventors: Hidekazu Fujie, Yamato (JP); Kazuo Oosumi, Fujisawa (JP); Tadashi Uchiyama, Kamakura (JP); Satoshi Hanawa, Fujisawa (JP); Naoto Murasawa, Yamato (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 15/025,004

(22) PCT Filed: Oct. 2, 2014

(86) PCT No.: PCT/JP2014/076408
§ 371 (c)(1),
(2) Date: Mar. 25, 2016

(87) PCT Pub. No.: WO2015/050206
PCT Pub. Date: Apr. 9, 2015

(65) Prior Publication Data
US 2016/0237873 A1    Aug. 18, 2016

(30) Foreign Application Priority Data
Oct. 4, 2013    (JP) ................. 2013-208918

(51) Int. Cl.
*F01N 3/00* (2006.01)
*F01N 11/00* (2006.01)
(Continued)

(52) U.S. Cl.
CPC .......... *F01N 11/002* (2013.01); *F01N 3/0253* (2013.01); *F01N 3/035* (2013.01);
(Continued)

(58) Field of Classification Search
CPC ............... F01N 11/002; F01N 2550/02; F01N 2550/04; F01N 2900/0418; F01N 3/035; F01N 2610/03; F01N 9/002
(Continued)

(56) References Cited

U.S. PATENT DOCUMENTS

| 2005/0188681 | A1* | 9/2005 | Emi ....................... F01N 3/023 60/277 |
| 2009/0308571 | A1 | 12/2009 | Thompson et al. |
| 2013/0269427 | A1* | 10/2013 | Nagaoka ............ B01D 46/0063 73/114.69 |

FOREIGN PATENT DOCUMENTS

| JP | 2003-106140 | 4/2003 |
| JP | 2005-307745 | 11/2005 |

(Continued)

OTHER PUBLICATIONS

International Preliminary Report on Patentability dated Apr. 5, 2016 in corresponding International Patent Application No. PCT/JP2014/076408.

(Continued)

*Primary Examiner* — Mark Laurenzi
*Assistant Examiner* — Anthony Ayala Delgado
(74) *Attorney, Agent, or Firm* — Staas & Halsey LLP (57) ABSTRACT

A diagnostic device for an exhaust gas purification system that has a diesel oxidation catalyst (DOC), a diesel particulate filter, and an exhaust pipe injection device. The device includes a sensor for detecting a temperature of the DOC, a first calculation unit for converting an integration time of the detected temperature between regeneration intervals into a thermal history time with respect to a predetermined set temperature, and calculating a degree of degradation of the DOC based on this thermal history time, a second calculation unit for calculating a quantity of heat generated in the DOC based on the detected temperature during a forced (Continued)

regeneration execution period, and calculating another degree of degradation of the DOC based on the quantity of heat generated; and a diagnosis unit for diagnosing a degradation state of the DOC based on the degrees of degradation entered from the first and second calculation units.

9 Claims, 4 Drawing Sheets (51) Int. Cl.
*F01N 3/035* (2006.01)
*F01N 9/00* (2006.01)
*F01N 3/025* (2006.01)
*F01N 13/00* (2010.01)

(52) U.S. Cl.
CPC ......... *F01N 9/002* (2013.01); *F01N 13/0097* (2014.06); *F01N 2260/022* (2013.01); *F01N 2550/02* (2013.01); *F01N 2550/04* (2013.01); *F01N 2560/06* (2013.01); *F01N 2610/03* (2013.01); *F01N 2900/0416* (2013.01); *F01N 2900/0418* (2013.01); *F01N 2900/0601* (2013.01); *F01N 2900/1618* (2013.01); *F01N 2900/1631* (2013.01); *Y02T 10/47* (2013.01)

(58) Field of Classification Search
USPC .................................. 60/272, 277, 295, 299
See application file for complete search history.

(56) References Cited

FOREIGN PATENT DOCUMENTS

JP      2009-156049     7/2009
JP      2010-112220     5/2010

OTHER PUBLICATIONS

Espacenet Bibliographic data Publication No. 2005-307745 published Nov. 4, 2005.
Espacenet Bibliographic data Publication No. 2009-156049 published Jul. 16, 2009.
Espacenet Bibliographic data Publication No. 2003-106140 published Apr. 9, 2003.
International Search Report mailed Dec. 22, 2014 corresponding to International Application No. PCT/JP2014/076408.
J-Plat Pat English abstract, Publication No. 2010-112220 published May 20, 2010.

* cited by examiner

DIAGNOSTIC DEVICE

CROSS-REFERENCE TO RELATED APPLICATIONS

This application is a U.S. National Stage Application, which claims the benefit under 35 U.S.C. §371 of PCT International Patent Application No. PCT/JP2014/076408, filed Oct. 2, 2014, which claims the foreign priority benefit under 35 U.S.C. §119 of Japanese Patent Application No. 2013-208918, filed Oct. 4, 2013, the contents of which are incorporated herein by reference.

TECHNICAL FIELD

The present invention relates to a diagnostic device, and in particular to diagnosis of degradation of an exhaust gas purifying catalyst arranged in an exhaust system of an internal combustion engine.

BACKGROUND ART

As an exhaust gas purifying catalyst to be arranged in an exhaust system of a diesel engine or the like, an oxidation catalyst (Diesel Oxidation Catalyst: DOC) for oxidizing hydrocarbons (HC), carbon monoxide (CO), and nitrogen monoxide (NO) contained in exhaust gas is known. In addition, a diesel particulate filter (DPF) for collecting particulate matter (PM) contained in the exhaust gas and other filtering devices are also known.

If a capability of the DOC to oxidize HC is degraded, a portion of HC which is supplied to the DOC by an exhaust pipe injection (in-pipe injection) or the like at the time of a forced regeneration of the DPF will experience a slip to the DPF on the downstream side without being oxidized by the DOC. Because the DPF also has a capability to oxidize HC, the portion of HC which has experienced a slip through the DOC may be oxidized and purified by the DPF. However, if HC oxidation performance of the DPF is also degraded, unburned HC which has experienced a slip through the DOC may pass through the DPF and released to the atmosphere. This may worsen undesired emissions. Thus, there is a demand to diagnose the capabilities of the DOC and the DPF to oxidize HC when the DOC and the DPF are on board (see, forexample, Patent Literature Document 1).

LISTING OF REFERENCES

Patent Literature Document 1: Japanese Patent Application Laid-Open Publication No. 2003-106140

Examples of techniques to diagnose the HC oxidation performance of the DOC and the DPF include a method of estimating HC heat generation rates of the DOC and the DPF at the time of the forced regeneration on the basis of detection values of exhaust gas temperature sensors arranged in front of and behind the DOC and the DPF, and comparing the HC heat generation rates to reference values. In particular, when a diagnosis as to the DPF is made, a slip amount of HC passing through the DOC at the time of a current forced regeneration needs to be estimated on the basis of an HC heat generation rate of the DOC which has been estimated at the time of an immediately previous forced regeneration. However, such a method, which gives consideration only to the HC heat generation rates in forced regeneration periods, does not take into account a thermal degradation of the DOC which occurs during a regeneration interval (i.e., a period from an end of a forced regeneration to a start of a next forced regeneration), and therefore may not be able to make a highly precise diagnosis.

SUMMARY OF THE INVENTION

A diagnostic device disclosed herein has an object to perform highly precise diagnoses as to the DOC and the DPF by taking into account the thermal degradation of the DOC which occurs during the regeneration interval.

A diagnostic device disclosed herein is a diagnostic device for an exhaust purification system including an oxidation catalyst arranged to oxidize hydrocarbons contained in exhaust gas, a filter arranged downstream of the oxidation catalyst with respect to an exhaust gas flowing direction to collect particulate matter contained in the exhaust gas, and a forced regeneration unit for performing a forced regeneration, i.e., supplying hydrocarbons to the oxidation catalyst and burning and removing particulate matter accumulated in the filter. The diagnostic device includes: a first temperature detecting unit for detecting a temperature of the oxidation catalyst; a first degradation degree calculation unit for converting a cumulative time of the temperature entered from the first temperature detecting unit to a thermal history time for a specified set temperature, and calculating a degradation degree of the oxidation catalyst on the basis of the thermal history time, in a period from an end of a forced regeneration to a start of a next forced regeneration; a second degradation degree calculation unit for calculating a quantity of heat generated in the oxidation catalyst on the basis of the temperature entered from the first temperature detecting unit in a forced regeneration period, and calculating the degradation degree of the oxidation catalyst on the basis of the quantity of heat generated; and a first diagnosis unit for performing a diagnosis as to degradation of the oxidation catalyst on the basis of at least one of the degradation degree introduced from the first degradation degree calculation unit and the degradation degree introduced from the second degradation degree calculation unit.

The diagnostic device disclosed herein is able to perform highly precise diagnoses as to a DOC and a DPF by taking into account a thermal degradation of the DOC which occurs during a regeneration interval.

DETAILED DESCRIPTION

A diagnostic device according to embodiments of the present invention will be described with reference to the accompanying drawings. Like parts are designated by like reference numerals, and such like parts have like names and functions. Accordingly, redundant detailed descriptions of such like parts will be omitted.

Figure 1:
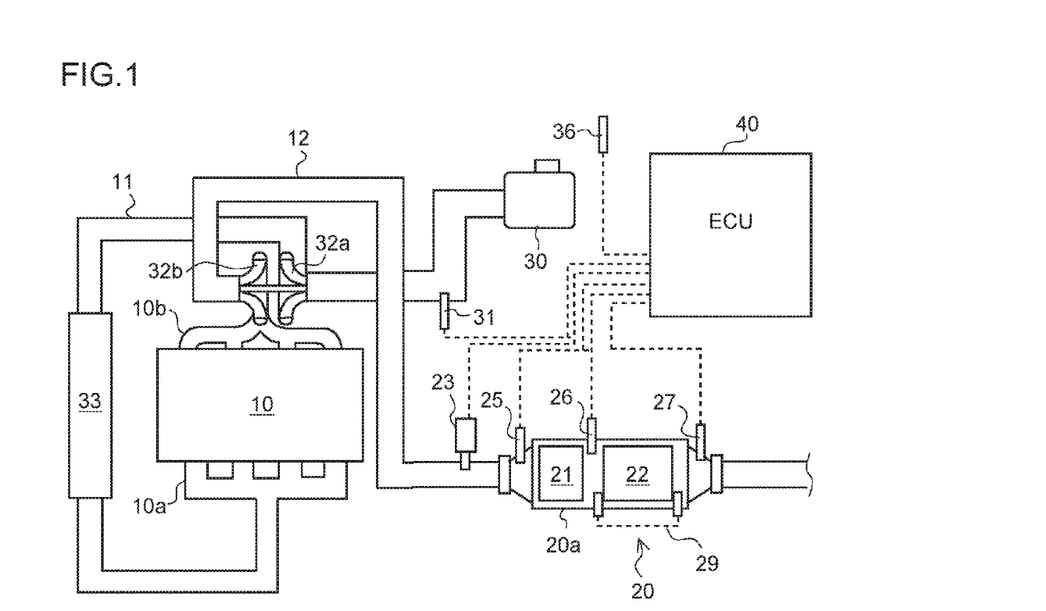
FIG. 1 is a schematic overall configuration diagram illustrating an intake and exhaust system of an engine to which a diagnostic device according to an embodiment of the present invention is applied.

As shown in FIG. 1, a diesel engine (hereinafter referred to simply as "engine") 10 has an intake manifold 10a and an exhaust manifold 10b. An intake passage 11 for introducing fresh air is connected to the intake manifold 10a, and an exhaust passage 12 for discharging exhaust gas to the atmosphere is connected to the exhaust manifold 10b.

On the intake passage 11, disposed are an air cleaner 30, a mass air flow sensor 31, a compressor 32a of a turbo charger, an intercooler 33, and so on in this order from the upstream side with respect to an intake air flowing direction. On the exhaust passage 12, disposed are a turbine 32b of the turbo charger, an exhaust gas after-treatment device 20, and so on are arranged in this order from the upstream side with respect to an exhaust gas flowing direction. It should be noted that in FIG. 1 reference numeral "36" denotes an outside air (ambient air) temperature sensor. The outside air temperature sensor 36 is a preferred example of a third temperature detecting unit according to the present invention.

The exhaust gas after-treatment device 20 includes a cylindrical catalyst casing 20a, a DOC 21, and a DPF 22. The DOC 21 is disposed upstream of the DPF 22 in the catalyst casing 20a. An exhaust pipe injection device 23 is arranged upstream of the DOC 21, a DOC inlet temperature sensor 25 is arranged upstream of the DOC 21, a DOC outlet temperature sensor 26 is arranged between the DOC 21 and the DPF 22, and a DPF outlet temperature sensor 27 is arranged downstream of the DPF 22. A differential pressure sensor 29, which is used to detect (measure) a difference in pressure between the upstream and downstream sides of the DPF 22, is arranged across the DPF 22.

The exhaust pipe injection device 23 is an example of a forced regeneration unit according to the present invention, and injects unburned fuel (mainly HC) into the exhaust passage 12 in response to an instruction signal issued from an electronic control unit (hereinafter referred to as "ECU") 40. It should be noted that if post-injections by means of multiple injections of the engine 10 are employed, the exhaust pipe injection device 23 may be omitted.

The DOC 21 includes a ceramic support having, for example, a cordierite honeycomb structure, and catalytic components supported on a surface of the ceramic support. As HC is supplied to the DOC 21 by the exhaust pipe injection device 23 or the post-injections, the DOC 21 oxidizes HC to elevate the temperature of the exhaust gas.

The DPF 22 includes, for example, a large number of cells defined by porous partitions and arranged along the exhaust gas flowing direction, with the upstream and downstream sides of the cells being sealed or plugged alternately. In the DPF 22, PM contained in the exhaust gas collects in pores of the partitions and on surfaces of the partitions. When an amount of accumulated PM reaches a predetermined amount, a so-called forced regeneration is carried out, i.e., the accumulated PM is burnt for removal. The forced regeneration is accomplished by supplying the unburned fuel (HC) into the DOC 21 through the exhaust pipe injection device 23 or the post-injections, and raising the temperature of the exhaust gas flowing into the DPF 22 up to a PM combustion temperature (for example, about 600 degrees C.). The DPF 22 has a capability to oxidize that portion of unburned HC which has experienced a slip through the DOC 21 without being oxidized by the upstream DOC 21.

The DOC inlet temperature sensor 25 is an example of a first temperature detecting unit according to the present invention, and detects the temperature (hereinafter referred to as "DOC inlet exhaust gas temperature") of the upstream exhaust gas flowing into the DOC 21. The DOC outlet temperature sensor 26 is an example of the first or second temperature detecting unit according to the present invention, and detects the temperature (hereinafter referred to as "DOC outlet exhaust gas temperature" or "DPF inlet exhaust gas temperature") of the downstream exhaust gas flowing out of the DOC 21. The DPF outlet temperature sensor 27 is an example of the second temperature detecting unit according to the present invention, and detects the temperature (hereinafter referred to as "DPF outlet exhaust gas temperature") of the downstream exhaust gas flowing out of the DPF 22. Detection values of the temperature sensors 25 to 27 are introduced to the ECU 40, which is electrically connected to the sensors 25 to 27.

The ECU 40 performs various types of control, such as control over the engine 10, the exhaust pipe injection device 23, and so on. The ECU 40 includes a CPU, a ROM, a RAM, input ports, output ports, and other elements which are known in the art.

Figure 2:
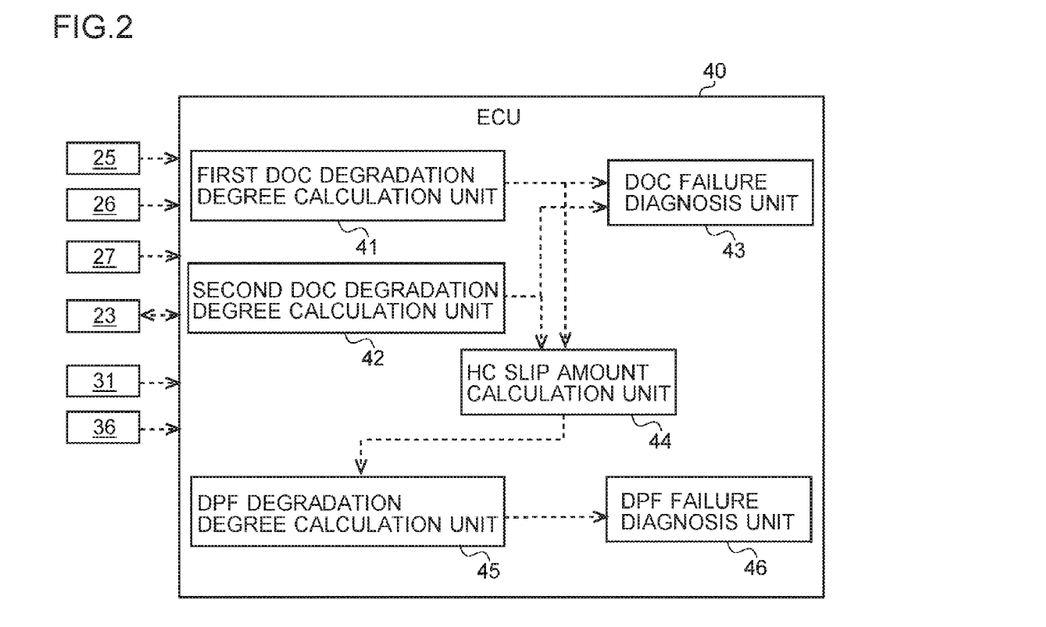
FIG. 2 is a functional block diagram of an electronic control unit according to an embodiment of the present invention.

As shown in FIG. 2, the ECU 40 also includes first DOC degradation degree calculation unit 41, second DOC degradation degree calculation unit 42, a DOC failure diagnosis unit 43, an HC slip amount calculation unit 44, a DPF degradation degree calculation unit 45, and a DPF failure diagnosis unit 46 as functional components thereof. It is assumed in the following description that all of these functional components are included in the ECU 40, which is a single unified piece of hardware. Alternatively, one or more of these functional components may be included in a separate piece of hardware.

The first DOC degradation degree calculation unit 41 is an example of a first degradation degree calculation unit according to the present invention, and calculates the degree (hereinafter referred to as "DOC degradation degree $D_{DOC\ int}$") of degradation of the DOC 21 in a period from an end of a forced regeneration of the DPF 22 to a start of a next forced regeneration of the DPF 22 (this period will be hereinafter referred to as "regeneration interval"). The DOC degradation degree $D_{DOC\ int}$ is calculated on the basis of an HC generated heat quantity ratio of the DOC 21 in the regeneration interval. A procedure for calculating the HC generated heat quantity ratio will be described below.

Figure 3:
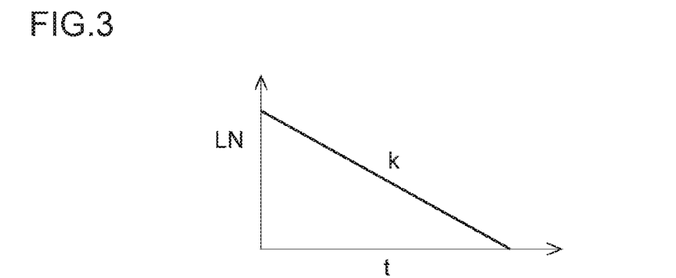
FIG. 3 is a graphic representation of the relationship between a generated heat quantity (calorific value) ratio and time.

Assuming that the ratio (hereinafter referred to as "HC generated heat quantity ratio" LN) of an amount (quantity) of heat generated in a DOC (for example, a new DOC) which has normal HC oxidation performance to a quantity of heat generated in a degraded DOC is linear with respect to time t as shown in FIG. 3, the generated heat quantity ratio LN is expressed by Equation 1, where k is a reaction rate constant.

$$LN = k \cdot t \qquad [\text{Equation 1}]$$

The Arrhenius equation is expressed by Equation 2, where Ea is activation energy, T is a fluid temperature, R is a fluid constant, and A is a frequency factor.

$$k = A\exp\left(\frac{-Ea}{RT}\right) \quad \text{[Equation 2]}$$

Taking the natural logarithm (LN) of Equation 2 yields Equation 3.

$$LNk = LNA - \frac{Ea}{R}\frac{1}{T} \quad \text{[Equation 3]}$$

Figure 4:
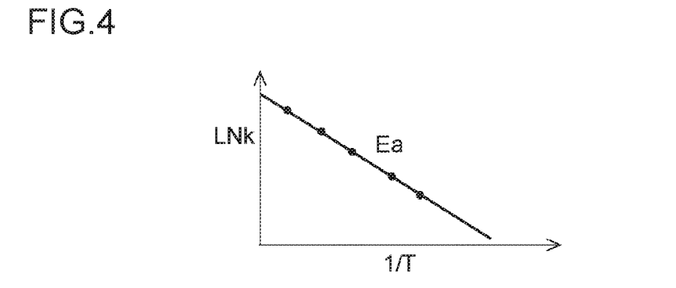
FIG. 4 shows a graph created by an Arrhenius plot.

The reaction rate constants k are calculated in advance for various temperatures of the DOC 21 by experiments or the like, and an Arrhenius plot is prepared on the basis of Equation 3, with the vertical axis representing LNk and the horizontal axis representing the reciprocal of the temperature, 1/T, as shown in FIG. 4. Then, the activation energy Ea can be determined from the inclination of the Arrhenius plot, and the frequency factor A can be determined from the intercept of the Arrhenius plot.

Figure 5:
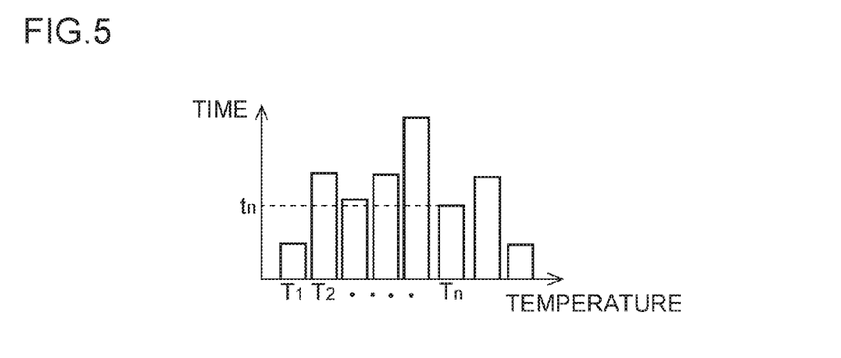
FIG. 5 is a graphic representation of cumulative times of temperature frequencies in a regeneration interval.
Figure 6:
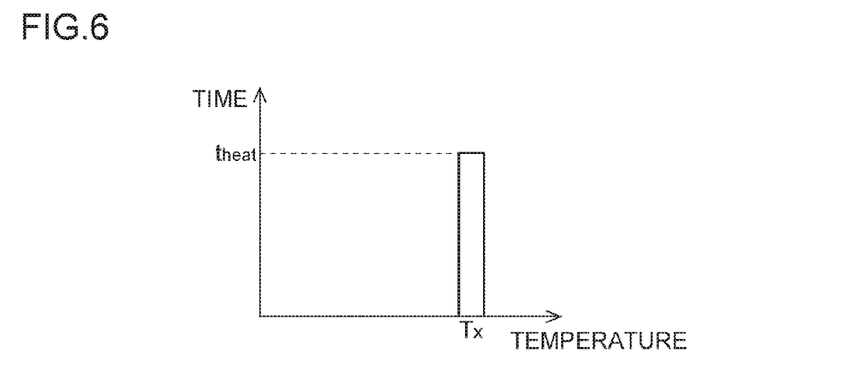
FIG. 6 shows a graphic representation obtained by converting the graph of FIG. 5 to a graph of a thermal history time for an arbitrary set temperature.

FIG. 5 shows an example of a temperature frequency $T_n$ of the DOC 21 in the regeneration interval integrated over time. A cumulative time $t_n$ of the temperature frequency $T_n$ can be converted to a thermal history time $t_{heat}$ for an arbitrary set temperature $T_X$ using Equation 4 (see FIG. 6). It should be noted that the thermal history time $t_{heat}$ refers to a heat load time which indicates how many hours the DOC 21 is supposed to have received a heat load during the regeneration interval if the temperature is fixed at the arbitrary set temperature $T_X$ during the regeneration interval. The arbitrary set temperature $T_X$ may be set appropriately in accordance with, for example, the volume of the DOC 21.

$$\frac{e^{\left(-\frac{Ea}{R \cdot T_n}\right)} \times t_n}{e^{\left(-\frac{Ea}{R \cdot T_X}\right)}} = t_{heat} \quad \text{[Equation 4]}$$

Determining the activation energy Ea and the frequency factor A in Equation 3 on the basis of the Arrhenius plot (see FIG. 4) and substituting the arbitrary set temperature $T_X$ in Equation 3 yield the reaction rate constant k for the arbitrary set temperature $T_X$. Substituting the reaction rate constant k and the thermal history time $t_{heat}$ obtained by conversion using Equation 4 in Equation 5 yields the generated heat quantity ratio LN of the DOC 21 in the regeneration interval.

$$LN = k \cdot t_{heat} \quad \text{[Equation 5]}$$

The reaction rate constant k for the arbitrary set temperature $T_X$ calculated by the above-described procedure, Equation 4, and Equation 5 are stored in advance in the ECU 40 of this embodiment. The first DOC degradation degree calculation unit 41 converts the cumulative time $t_n$ of the temperature frequency $T_n$ of the DOC 21, which is entered from the DOC inlet temperature sensor 25 in the regeneration interval, to the thermal history time $t_{heat}$ for the arbitrary set temperature $T_X$ on the basis of Equation 4. Then, the first DOC degradation degree calculation unit 41 calculates the DOC degradation degree $D_{DOC\ int}$ (=1−LN) in the regeneration interval on the basis of the generated heat quantity ratio LN obtained by substituting the thermal history time $t_{heat}$ in Equation 5. It should be noted that the cumulative time $t_n$ of the temperature frequency $T_n$ may be detected using a timer that is built in the ECU 40 or the like, for example. It should also be noted that the temperature frequency $T_n$ may be obtained as the average of a detection value of the DOC inlet temperature sensor 25 and a detection value of the DOC outlet temperature sensor 26.

The second DOC degradation degree calculation unit 42 is an example of a second degradation degree calculation unit according to the present invention, and calculates the degree (hereinafter referred to as "DOC degradation degree $D_{DOC\ reg}$") of degradation of the DOC 21 in a forced regeneration period, i.e., a period during which the forced regeneration is applied to the DPF 22. The DOC degradation degree $D_{DOC\ reg}$ is calculated on the basis of an actual HC heat generation rate of the DOC 21 in the forced regeneration period. A procedure for calculating the actual HC heat generation rate of the DOC 21 at the time of the forced regeneration will be described below.

Figure 7:
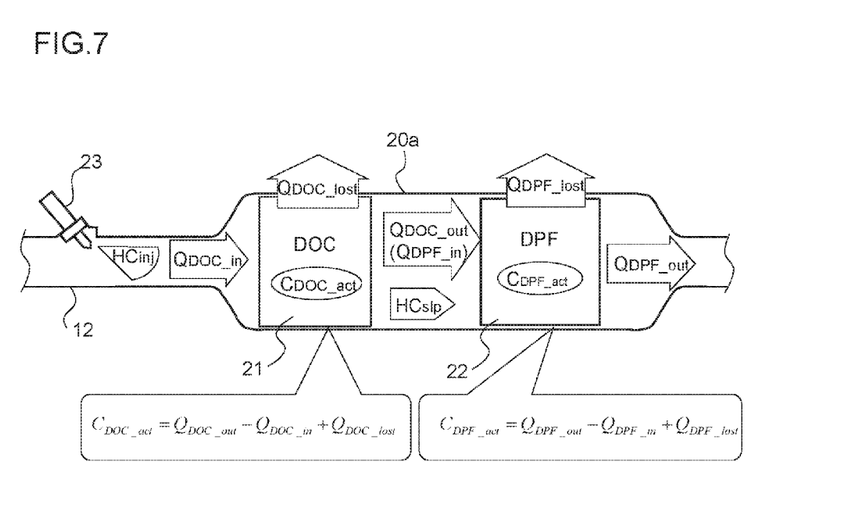
FIG. 7 is a schematic diagram useful to describe conservation of energy generated by oxidation of HC supplied to a DOC at the time of a forced regeneration and by oxidation of a portion of HC which has experienced a slip to a DPF through the DOC.

As shown in FIG. 7, the actual quantity $C_{DOC\ act}$ of heat generated by HC supplied from the exhaust pipe injection device 23 into the DOC 21 at the time of the forced regeneration can be obtained by adding the quantity $Q_{DOC\ lost}$ of heat loss, i.e., the quantity of heat dissipated from the DOC 21 to the outside air, to an exhaust gas energy difference between exhaust gas energy $Q_{DOC\ in}$ on the upstream side of the DOC 21 and exhaust gas energy $Q_{DOC\ out}$ on the downstream side of the DOC 21.

The exhaust gas energy $Q_{DOC\ in}$ on the upstream side is calculated on the basis of Equation 6, and the exhaust gas energy $Q_{DOC\ out}$ on the downstream side is calculated on the basis of Equation 7.

$$Q_{Doc\_in} = c_{exh} \cdot m_{exh} \cdot T_{DOC\_in} \quad \text{[Equation 6]}$$

$$Q_{DOC\_out} = c_{exh} \cdot m_{exh} \cdot T_{DOC\_out} \quad \text{[Equation 7]}$$

In Equations 6 and 7, $c_{exh}$ denotes specific heat of the exhaust gas. $m_{exh}$ denotes the flow rate of the exhaust gas, which is obtained from a detection value of the MAF sensor 31, an amount of fuel injection by the engine 10, and so on. It should be noted that the flow rate $m_{exh}$ of the exhaust gas may be obtained directly from an exhaust gas flow rate sensor (not shown) or the like. $T_{DOC\ in}$ denotes the DOC inlet exhaust gas temperature, which is obtained by the DOC inlet temperature sensor 25. $T_{DOC\ out}$ denotes the DOC outlet exhaust gas temperature, which is obtained by the DOC outlet temperature sensor 26.

The quantity $Q_{DOC\ lost}$ of heat loss can be assumed to be a sum of quantity $Q_{DOC\ natural}$ of heat loss caused by natural convection and quantity $Q_{DOC\ forced}$ of heat loss caused by forced convection (i.e., $Q_{DOC\ lost} = Q_{DOC\ natural} + Q_{DOC\ forced}$).

The quantity $Q_{DOC\ natural}$ of heat loss caused by the natural convection is calculated on the basis of Equation 8.

$$Q_{DOC\_natural} = h_{n\_DOC} \cdot A_{s\_DOC} \cdot (T_{DOC\_brick} - T_{ambient}) \quad \text{[Equation 8]}$$

In Equation 8, $A_{s\ DOC}$ denotes the effective area of an outer circumferential surface of the DOC 21 (or an outer circumferential surface of that portion of the catalyst casing 20a in which the DOC 21 is arranged). $T_{DOC\ brick}$ denotes the internal temperature of the DOC 21, which is calculated as the average of the DOC inlet exhaust gas temperature $T_{DOC\ in}$ and the DOC outlet exhaust gas temperature $T_{DOC\ out}$. $T_{ambient}$ denotes the temperature of the outside air (ambient air), which is obtained by the outside air temperature sensor 36. $h_{n\ DOC}$ denotes a heat transfer coefficient of natural convection, which is given by Equation 9.

$$h_{n\_DOC} = \frac{Nu_{n\_DOC} \cdot k}{L_{n\_DOC}} \qquad \text{[Equation 9]}$$

In Equation 9, k denotes thermal conductivity of air. $L_{n\_DOC}$ denotes a characteristic length of the DOC 21, which is determined appropriately in accordance with, for example, the volume of the DOC 21. $Nu_{n\_DOC}$ denotes a Nusselt number for natural convection.

The DOC 21 has a generally cylindrical shape, and the catalyst casing 20*a*, in which the DOC 21 is housed, has a substantially cylindrical shape. Therefore, oxidation heat generated in the DOC 21 is presumably dissipated to the outside air through entire cylindrical outer circumferential surfaces of the DOC 21 and the catalyst casing 20*a*. Assuming that heat dissipation by natural convection causes heat to transfer through the entire cylindrical outer circumferential surface with an axis of the cylindrical shape being horizontally oriented, the Nusselt number $Nu_{n\_DOC}$ is given by Equation 10, where Gr is the Grashof number, and Pr is the Prandtl number.

$$Nu_{n\_DOC} = 0.53 \times (Gr \cdot Pr)^{0.25} \qquad \text{[Equation 10]}$$

The quantity $Q_{DOC\_forced}$ of heat loss caused by forced convection is calculated on the basis of Equation 11.

$$Q_{DOC\_forced} = h_{f\_DOC} \cdot A_{f\_DOC} \cdot (T_{DOC\_brick} - T_{ambient}) \qquad \text{[Equation 11]}$$

In Equation 11, $A_{f\_DOC}$ denotes the effective area of the outer circumferential surface of the DOC 21 (or the outer circumferential surface of that portion of the catalyst casing 20*a* in which the DOC 21 is arranged). $h_{f\_DOC}$ denotes a heat transfer coefficient of forced convection, which is given by Equation 12.

$$h_{f\_DOC} = \frac{Nu_{f\_DOC} \cdot k}{L_{f\_DOC}} \qquad \text{[Equation 12]}$$

In Equation 12, $L_{f\_DOC}$ denotes the characteristic length of the DOC 21, which is determined appropriately in accordance with, for example, the volume of the DOC 21. $Nu_{f\_DOC}$ denotes a Nusselt number for forced convection.

Figure 8:
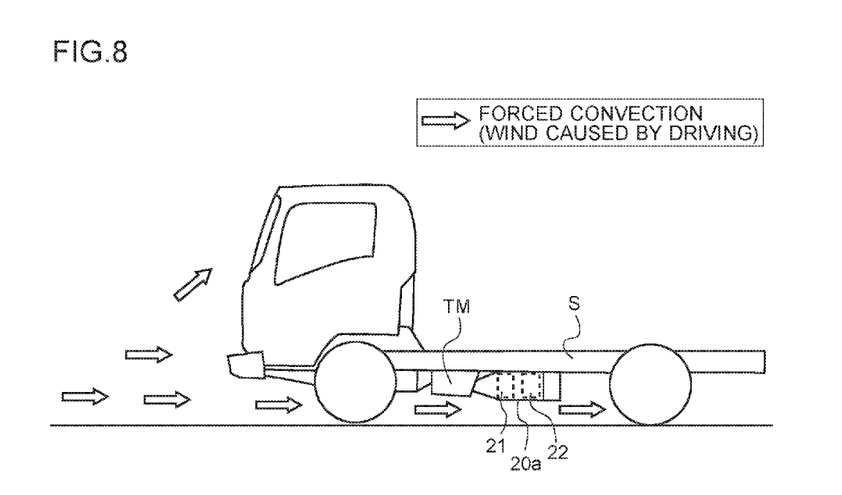
FIG. 8 is a schematic side view useful to describe a heat loss in the DOC and the DPF due to influences of forced convection.

As illustrated in FIG. 8, the catalyst casing 20*a*, in which the DOC 21 is housed, is typically fixed to a lower portion of a chassis frame S of a vehicle body, and a transmission TM and other components are arranged in front of the catalyst casing 20*a*. Accordingly, a wind which flows from in front of the vehicle body into a space below the vehicle body while the vehicle is running can be assumed to be a planar turbulent flow which influences only a lower surface portion of the DOC 21 (or of the catalyst casing 20*a*). Therefore, the Nusselt number $Nu_{f\_DOC}$ for forced convection is given by Equation 13, which is derived by solving a heat transfer equation for planar turbulence.

$$Nu_{f\_DOC} = 0.037 \times Re^{0.8} \times Pr^{0.33} \qquad \text{[Equation 13]}$$

In Equation 13, Re denotes the Reynolds number. The Reynolds number Re is given by Equation 14, where v is the average velocity of air, ρ is air density, $L_{f\_DOC}$ is the characteristic length of the DOC 21, and μ is a dynamic viscosity coefficient.

$$Re = \frac{v \cdot \rho \cdot L_{f\_DOC}}{\mu} \qquad \text{[Equation 14]}$$

The second DOC degradation degree calculation unit 42 adds the quantity $Q_{DOC\ lost}$ of heat loss, which is calculated on the basis of Equations 8 to 14, to the exhaust gas energy difference between the exhaust gas energy $Q_{DOC\ in}$ on the upstream side, which is calculated on the basis of Equation 6, and the exhaust gas energy $Q_{DOC\ out}$ on the downstream side, which is calculated on the basis of Equation 7, to calculate the actual quantity $C_{DOC\ act}$ of heat generated by HC in the DOC 21 in the forced regeneration period. The second DOC degradation degree calculation unit 42 then divides the actual quantity $C_{DOC\ act}$ of heat generated by HC by a theoretical quantity $C_{DOC\ theo}$ of heat to be generated by an exhaust pipe injection (or post-injection) to calculate the actual HC heat generation rate $C_{DOC\ act\ \%}$. The second DOC degradation degree calculation unit 42 calculates the DOC degradation degree $D_{DOC\ reg}$ (=1-$C_{DOC\ act\ \%}$) in the forced regeneration period on the basis of the actual HC heat generation rate $C_{DOC\ act\ \%}$. It should be noted that the theoretical quantity $C_{DOC\ theo}$ of heat to be generated is obtained by multiplying the amount $HC_{inj\ qty}$ of the exhaust pipe injection (or the amount of the post-injection) by a theoretical HC heat generation rate $C_{theo\ \%}$ (i.e., $C_{DOC\ theo} = HC_{inj\ qty} \times C_{theo\ \%}$).

The DOC failure diagnosis unit 43 is an example of a first diagnosis unit according to the present invention, and determines whether the DPF 22 is malfunctioning on the basis of the DOC degradation degree $D_{DOC\ int}$, which is entered from the first DOC degradation degree calculation unit 41, and the DOC degradation degree $D_{DOC\ reg}$, which is entered from the second DOC degradation degree calculation unit 42. For example, the DOC 21 is determined to be malfunctioning if the DOC degradation degree $D_{DOC\ int}$ or the DOC degradation degree $D_{DOC\ reg}$ is greater than a predetermined upper limit threshold value $D_{DOC\ max}$, which indicates a degradation in HC oxidation performance.

The HC slip amount calculation unit 44 is an example of a slip amount calculation unit according to the present invention, and calculates the slip amount $HC_{slp\ qty}$ of unburned HC flowing into the downstream DPF 22 without being oxidized by the DOC 21 on the basis of the DOC degradation degree $D_{DOC\ int}$, which is entered from the first DOC degradation degree calculation unit 41, and the DOC degradation degree $D_{DOC\ reg}$, which is entered from the second DOC degradation degree calculation unit 42. The slip amount $HC_{slp\ qty}$ is calculated by multiplying the amount $HC_{inj\ qty}$ of the exhaust pipe injection for a current forced regeneration by the sum of the DOC degradation degree $D_{DOC\ reg}$ calculated in an immediately previous forced regeneration period and the DOC degradation degree $D_{DOC\ int}$ calculated in an immediately previous regeneration interval (i.e., $HC_{slp\ qty} = HC_{inj\ qty} \times (D_{DOC\ int} + D_{DOC\ reg})$).

The DPF degradation degree calculation unit 45 is an example of a third degradation degree calculation unit according to the present invention, and calculates the degree (hereinafter referred to as "DPF degradation degree $D_{DPF\ reg}$") of degradation of the DPF 22 in the forced regeneration period. The DPF degradation degree $D_{DPF\ reg}$ is calculated on the basis of an actual heat generation rate for that portion of HC which has flowed into the DPF 22 after experiencing a slip through the DOC 21 at the time of the forced regeneration. A procedure for calculating the actual HC heat generation rate at the time of the forced regeneration of the DPF 22 will be described below.

Referring to FIG. 7, the actual quantity $C_{DPF\ act}$ of heat generated by that portion of HC which is oxidized by the DPF 22 after experiencing a slip through the DOC 21 can be obtained by adding the quantity $Q_{DPF\ lost}$ of heat loss, i.e., the quantity of heat dissipated from the DPF 22 to the outside air, to an exhaust gas energy difference between energy $Q_{DPF\_in}$ of the exhaust gas on the upstream side of the DPF 22 and energy $Q_{DPF\_out}$ of the exhaust gas on the downstream side of the DPF 22.

The energy $Q_{DPF\_in}$ of the exhaust gas on the upstream side is calculated on the basis of Equation 15, and the energy $Q_{DPF\_out}$ of the exhaust gas on the downstream side is calculated on the basis of Equation 16.

$$Q_{DPF\_in} = c_{exh} \cdot m_{exh} \cdot T_{DPF\_in} \quad \text{[Equation 15]}$$

$$Q_{DPF\_out} = c_{exh} \cdot m_{exh} \cdot T_{DPF\_out} \quad \text{[Equation 16]}$$

In Equations 15 and 16, $T_{DPF\_in}$ denotes the DPF inlet exhaust gas temperature, which is acquired by the DOC outlet temperature sensor 26. $T_{DPF\_out}$ denotes the DPF outlet exhaust gas temperature, which is acquired by the DPF outlet temperature sensor 27.

The quantity $Q_{DPF\_lost}$ of heat loss can be assumed to be a sum of the quantity $Q_{DPF\_natural}$ of heat loss caused by natural convection and the quantity $Q_{DPF\_forced}$ of heat loss caused by forced convection (i.e., $Q_{DPF\_lost} = Q_{DPF\_natural} + Q_{DPF\_forced}$).

The quantity $Q_{DPF\_natural}$ of heat loss caused by natural convection is calculated on the basis of Equation 17.

$$Q_{DPF\_natural} = h_{n\_DPF} \cdot A_{s\_DPF} \cdot (T_{DPF\_brick} - T_{ambient}) \quad \text{[Equation 17]}$$

In Equation 17, $A_{s\_DPF}$ denotes the effective area of an outer circumferential surface of the DPF 22 (or an outer circumferential surface of that portion of the catalyst casing 20a in which the DPF 22 is arranged). $T_{DPF\_brick}$ denotes the internal temperature of the DPF 22, which is calculated as the average of the DPF inlet exhaust gas temperature $T_{DPF\_in}$ and the DPF outlet exhaust gas temperature $T_{DPF\_out}$. $h_{n\_DPF}$ denotes a heat transfer coefficient of natural convection, which is given by Equation 18.

$$h_{n\_DPF} = \frac{Nu_{n\_DPF} \cdot k}{L_{n\_DPF}} \quad \text{[Equation 18]}$$

In Equation 18, $L_{n\_DPF}$ denotes a characteristic length of the DPF 22, which is determined appropriately in accordance with, for example, the volume of the DPF 22. $Nu_{n\_DPF}$ denotes a Nusselt number for natural convection, which is given by Equation 19 on the assumption that heat is dissipated through the entire cylindrical outer circumferential surfaces of the DPF 22 and the catalyst casing 20a, as is similarly the case with Equation 10.

$$Nu_{n\_DPF} = 0.53 \times (Gr \cdot Pr)^{0.25} \quad \text{[Equation 19]}$$

The quantity $Q_{DPF\_forced}$ of heat loss caused by forced convection is calculated on the basis of Equation 20.

$$Q_{DPF\_forced} = h_{f\_DPF} \cdot A_{f\_DPF} \cdot (T_{DPF\_brick} - T_{ambient}) \quad \text{[Equation 20]}$$

In Equation 20, $A_{f\_DPF}$ denotes the effective area of the outer circumferential surface of the DPF 22 (or the outer circumferential surface of that portion of the catalyst casing 20a in which the DPF 22 is arranged), and $h_{f\_DPF}$ denotes a heat transfer coefficient of forced convection, which is given by Equation 21.

$$h_{f\_DPF} = \frac{Nu_{f\_DPF} \cdot k}{L_{f\_DPF}} \quad \text{[Equation 21]}$$

In Equation 21, $L_{f\_DPF}$ denotes the characteristic length of the DPF 22, which is determined appropriately in accordance with, for example, the volume of the DPF 22. $Nu_{f\_DPF}$ denotes a Nusselt number for forced convection, which is given by Equation 22 on the assumption that the forced convection causes a planar turbulent flow which influences only a lower surface portion of the DPF 22 (or of the catalyst casing 20a), as is similarly the case with Equation 8.

$$Nu_{f\_DPF} = 0.037 \times Re^{0.9} \times Pr^{0.33} \quad \text{[Equation 22]}$$

The Reynolds number Re in Equation 17 is given by Equation 23, where v is the average velocity of air, $\rho$ is air density, $L_{f\_DPF}$ is the characteristic length of the DPF 22, and $\mu$ is a dynamic viscosity coefficient.

$$Re = \frac{v \cdot p \cdot L_{f\_DPF}}{\mu} \quad \text{[Equation 23]}$$

The DPF degradation degree calculation unit 45 adds the quantity $Q_{DPF\_lost}$ of heat loss, which is calculated on the basis of Equations 17 to 23, to the exhaust gas energy difference between the energy $Q_{DPF\_in}$ of the exhaust gas on the upstream side, which is calculated on the basis of Equation 15, and the energy $Q_{DPF\_out}$ of the exhaust gas on the downstream side, which is calculated on the basis of Equation 16, to calculate the actual quantity $C_{DPF\_act}$ of heat generated by HC in the DPF 22 in the forced regeneration period. The DPF degradation degree calculation unit 45 then divides the actual quantity $C_{DPF\_act}$ of heat generated by HC by a theoretical quantity $C_{DPF\_theo}$ of heat to be generated by that portion of HC which has experienced a slip to calculate the actual HC heat generation rate $C_{DPF\_act\ \%}$, and calculates the DPF degradation degree $D_{DPF\_reg}$ ($=1-C_{DPF\_act\ \%}$) in the forced regeneration period on the basis of this actual HC heat generation rate $C_{DPF\_act\ \%}$. It should be noted that the theoretical quantity $C_{DPF\_theo}$ of heat to be generated is obtained by multiplying the slip amount $HC_{slp\ qty}$ by a theoretical HC heat generation rate $C_{theo\ \%}$ (i.e., $C_{DPF\_theo} = C_{slp\ qty} \times C_{theo\ \%}$).

The DPF failure diagnosis unit 46 is an example of a second diagnosis unit according to the present invention, and determines whether the DPF 22 is malfunctioning on the basis of the DPF degradation degree $D_{DPF\_reg}$, which is entered from the DPF degradation degree calculation unit 45. For example, the DPF 22 is determined to be malfunctioning if the DPF degradation degree $D_{DPF\_reg}$ is greater than a predetermined upper limit threshold value $D_{DPF\_max}$, which indicates a degradation in HC oxidation performance.

Figure 9:
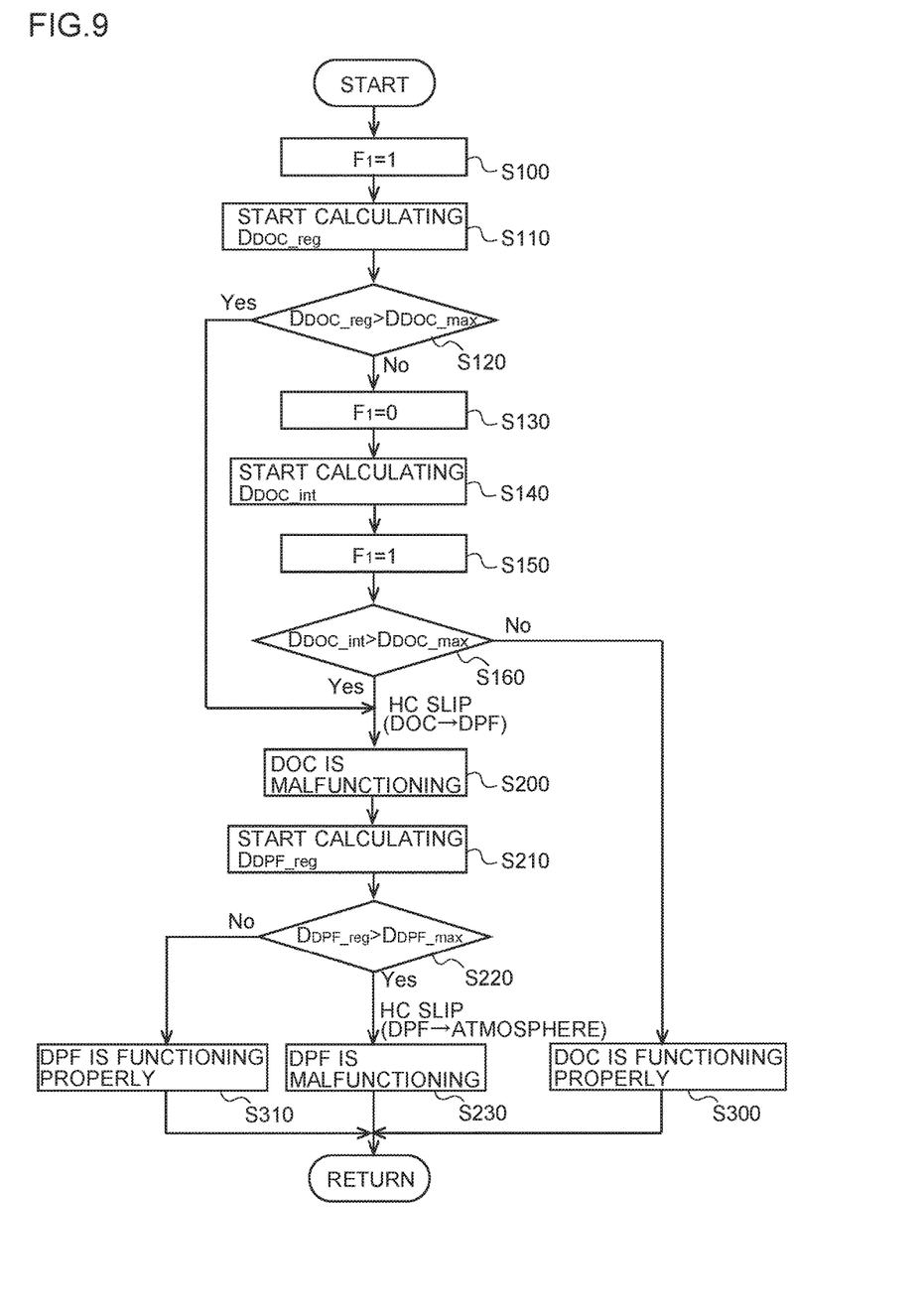
FIG. 9 is a flowchart illustrating control performed by the diagnostic device according to the embodiment of the present invention.

Next, a control flow of the diagnostic device according to this embodiment will be described below with reference to FIG. 9. In a flowchart of FIG. 9, "$F_1$" denotes a flag to indicate a start of a forced regeneration of the DPF 22. The flag is set to ON (i.e., $F_1=1$) when the forced regeneration starts, and is set to OFF (i.e., $F_1=0$) when the forced regeneration ends. A determination as to whether the forced regeneration has started is made on the basis of a detection value of the differential pressure sensors 29, and a determination as to whether the forced regeneration has ended is made on the basis of a value calculated by the ECU 40.

If a forced regeneration of the DPF 22 is started (i.e., $F_1=1$) at step (hereinafter, "Step" will be denoted simply as "S") 100, a calculation of the DOC degradation degree $D_{DOC\_reg}$ in the forced regeneration period is started at S110.

If a predetermined time elapses after the start of the forced regeneration, and the calculation of the DOC degradation degree $D_{DOC\ reg}$ is finished, a determination as to whether the DOC 21 is malfunctioning in the forced regeneration period is performed at S120. If the DOC degradation degree $D_{DOC\ reg}$ is greater than the upper limit threshold value $D_{DOC\ max}$ (Yes), it means that a slip of HC to the downstream DPF 22 has occurred, and the control proceeds to S200, and the DOC 21 is determined to be malfunctioning. On the other hand, if the DOC degradation degree $D_{DOC\ reg}$ is no greater than the upper limit threshold value $D_{DOC\ max}$ (No), it means that a degradation in the HC oxidation performance has not occurred, and the control proceeds to S130.

If the forced regeneration of the DPF 22 ends (i.e., $F_1$=0) at S130, a calculation of the DOC degradation degree $D_{DOC\ int}$ in the regeneration interval is started at S140.

If a next forced regeneration is started (i.e., $F_1$=1) at S150, the calculation of the DOC degradation degree $D_{DOC\ int}$ is finished. Accordingly, at S160, a determination as to whether the DOC 21 is malfunctioning in the regeneration interval is performed. If the DOC degradation degree $D_{DOC\ int}$ is greater than the upper limit threshold value $D_{DOC\ max}$ (Yes), it means that a slip of HC to the downstream DPF 22 has occurred, and the control proceeds to S200. On the other hand, if the DOC degradation degree $D_{DOC\ int}$ is equal to or less than the upper limit threshold value $D_{DOC\ max}$ (No), it means that a degradation in the HC oxidation performance of the DOC 21 has not occurred (i.e., a slip of HC does not occur), and the control proceeds to S300 to determine that the DOC 21 is functioning in a normal state.

At S210, a calculation of the DPF degradation degree $D_{DPF\ reg}$ in the forced regeneration period is started. The slip amount of HC is calculated by multiplying the amount $HC_{inj\ qty}$ of the exhaust pipe injection for the current forced regeneration by the sum of the DOC degradation degree $D_{DOC\ reg}$ in the forced regeneration period calculated at S110 and the DOC degradation degree $D_{DOC\ int}$ in the regeneration interval calculated at S140.

If a predetermined time elapses after the start of the forced regeneration, and the calculation of the DPF degradation degree $D_{DPF\ reg}$ is finished, a determination as to whether the DPF 22 is malfunctioning is made at S220. If the DPF degradation degree $D_{DPF\ reg}$ is greater than the upper limit threshold value $D_{DPF\ max}$ (Yes), it means that a slip of HC through the DPF 22 may occur to permit HC to be emitted to the atmosphere, and the control proceeds to S230 to determine that the DPF 22 is malfunctioning. On the other hand, if the DPF degradation degree $D_{DPF\_regg}$ is equal to or less than the upper limit threshold value $D_{DOC\ max}$ (No), it means that a degradation in the HC oxidation performance of the DPF 22 has not occurred (i.e., that portion of HC which has experienced a slip through the DOC 21 can be subjected to purification by the DPF 22), and the control proceeds to S310 to determine that the DPF 22 (i.e., the exhaust gas after-treatment device 20) is functioning properly. Thereafter, the above-described control steps are repeatedly performed until an ignition key is turned off.

Next, beneficial effects of the diagnostic device according to the embodiments of the present invention will be described below.

Diagnoses as to degradation of the DOC 21 and the DPF 22 are typically made by estimating, for example, the HC heat generation rates of the DOC 21 and the DPF 22 at the time of the forced regeneration. In particular, when a diagnosis as to the degradation of the DPF 22 is made, a slip amount of HC at the time of a current forced regeneration needs to be estimated on the basis of an HC heat generation rate of the DOC 21 which has been estimated at the time of an immediately previous forced regeneration. Such a method, however, does not take into account a thermal degradation of the DOC 21 which occurs during the regeneration interval, and therefore may not be able to make a highly precise diagnosis.

On the contrary, the diagnostic device according to this embodiment calculates the thermal history time of the DOC 21 in the regeneration interval, and calculates the DOC degradation degree in the regeneration interval on the basis of the generated heat quantity ratio obtained from this thermal history time. Further, when a diagnosis as to the degradation of the DPF 22 is made, the diagnostic device of this embodiment calculates the slip amount of HC flowing from the DOC 21 into the DPF 22 while taking into account both the DOC degradation degree in the regeneration interval and the DOC degradation degree in the forced regeneration period.

Accordingly, the diagnostic device of this embodiment is able to calculate the slip amount of HC while taking into account the thermal degradation of the DOC 21 which occurs during the regeneration interval, and is therefore able to make highly precise diagnoses as to the degradation of the DOC 21 and the DPF 22.

In addition, in the diagnostic device of this embodiment, the actual quantity of heat generated by HC supplied to the DOC 21 at the time of the forced regeneration is calculated on the basis of the exhaust gas energy difference between the energy of the exhaust gas on the upstream side of the DOC 21 and the energy of the exhaust gas on the downstream side of the DOC 21, and the quantity of heat loss, i.e., the quantity of heat dissipated from the DOC 21 to the outside air. The actual quantity of heat generated by that portion of HC which is oxidized by the DPF 22 after experiencing a slip through the DOC 21 is calculated on the basis of the exhaust gas energy difference between the energy of the exhaust gas on the upstream side of the DPF 22 and the energy of the exhaust gas on the downstream side of the DPF 22, and the quantity of heat loss, i.e., the quantity of heat dissipated from the DPF 22 to the outside air.

Therefore, as compared to a method of calculating the quantity of heat generated by HC in each of the DOC 21 and the DPF 22 at the time of the forced regeneration only on the basis of a difference between the temperature of the exhaust gas on the upstream side and the temperature of the exhaust gas on the downstream side, the diagnostic device of this embodiment is configured to provide a more precise calculation thereof by taking into account the quantity of heat loss to the outside air. Accordingly, the diagnostic device of this embodiment can achieve an effective improvement in precision of diagnosis that is applied to each of the DOC 21 and the DPF 22 at the time of the forced regeneration.

It should be noted that the present invention is not limited to the above-described embodiment, and that modifications can be made as appropriate without departing from the scope and spirit of the present invention.

For example, although it has been assumed in the foregoing description that a degradation diagnosis is performed to the DPF 22 when a slip of HC through the DOC 21 has occurred, the degradation diagnosis of the DPF 22 may be performed even when a degradation of the DOC 21 has not occurred. In this configuration, an amount of the exhaust pipe injection (or the amount of the post-injection) may be increased to intentionally cause a slip of HC through the DOC 21. The engine 10 is not limited to the diesel engine, and embodiments of the present invention can be widely applied to other internal combustion engines, such as gasoline engines.

The invention claimed is:

1. A diagnostic device for use with an exhaust purification system including an oxidation catalyst to oxidize hydrocarbons contained in exhaust gas, and a filter downstream of the oxidation catalyst with respect to a flowing direction of the exhaust gas to accumulate particulate matter contained in the exhaust gas, and to undergo forced regeneration by hydrocarbons supplied to the oxidation catalyst to burn and remove the particulate matter accumulated in the filter, the diagnostic device comprising:
   a first temperature sensor to detect a temperature of the oxidation catalyst;
   a controller configured to
      calculate a thermal history time of the oxidation catalyst, which is a time period during which a heat load is received relative to a predetermined set temperature during a regeneration interval of the oxidation catalyst,
      calculate a first degradation degree of the oxidation catalyst based on the thermal history time,
      calculate a first quantity of heat generated in the oxidation catalyst based on the temperature from the first temperature sensor in a forced regeneration period, and
      calculate a second degradation degree of the oxidation catalyst based on the first quantity of heat generated, and
      perform a diagnosis as to degradation of the oxidation catalyst based on at least one of the first degradation degree and the second degradation degree.

2. The diagnostic device according to claim 1, wherein the calculation of the first degradation degree is based on a generated heat quantity ratio that is obtained by multiplying a preset reaction rate constant of the oxidation catalyst by the thermal history time.

3. The diagnostic device according to claim 1 further comprising:
   a second temperature sensor to detect a temperature of the filter,
   wherein the controller is further configured to
      calculate a slip amount of hydrocarbons passing through the oxidation catalyst in the forced regeneration period, based on the first degradation degree and the second degradation degree,
      calculate a second quantity of heat generated in the filter based on the temperature from the second temperature sensor in the forced regeneration period and the slip amount,
      calculate a third degradation degree of the filter based on the second quantity of heat generated, and
      perform a diagnosis as to degradation of the filter based on the third degradation degree.

4. The diagnostic device according to claim 3 further comprising:
   a third temperature sensor to detect a temperature of an ambient air,
   wherein the controller is further configured to
      calculate a first quantity of heat loss from the oxidation catalyst to the ambient air based on a detection value of the third temperature sensor, and
      calculate the first quantity of heat generated in the oxidation catalyst while taking the first quantity of heat loss into account,
      a second quantity of heat loss from the filter into the ambient air based on the detection value of the third temperature sensor, and
      calculate the second quantity of heat generated in the filter while taking the second quantity of heat loss into account.

5. The diagnostic device according to claim 2 further comprising:
   a second temperature sensor to detect a temperature of the filter;
   wherein the controller is further configured to
      calculate a slip amount of hydrocarbons passing through the oxidation catalyst in the forced regeneration period, based on the first degradation degree and the second degradation degree,
      calculate a second quantity of heat generated in the filter based on the temperature from the second temperature sensor in the forced regeneration period and the slip amount,
      calculate a third degradation degree of the filter based on the second quantity of heat generated; and
      perform a diagnosis as to degradation of the filter based on the third degradation degree.

6. The diagnostic device according to claim 5 further comprising:
   a third temperature sensor to detect a temperature of an ambient air,
   wherein the controller is further configured to
      calculate a first quantity of heat loss from the oxidation catalyst to the ambient air based on a detection value of the third temperature sensor,
      calculate the first quantity of heat generated in the oxidation catalyst while taking the first quantity of heat loss into account,
      calculate a second quantity of heat loss from the filter into the ambient air based on the detection value of the third temperature sensor, and
      calculate the second quantity of heat generated in the filter while taking the second quantity of heat loss into account.

7. The diagnostic device according to claim 1, wherein the filter is a diesel particulate filter.

8. The diagnostic device according to claim 1, wherein the exhaust gas is emitted from a diesel engine.

9. The diagnostic device according to claim 1, wherein the diagnostic device is mounted on a vehicle.

* * * * *